(12) United States Patent
Rittmueller et al.

(10) Patent No.: US 7,362,225 B2
(45) Date of Patent: Apr. 22, 2008

(54) FLEXIBLE OCCUPANT SENSOR AND METHOD OF USE

(75) Inventors: Phillip Rittmueller, St. Charles, IL (US); Shiuh-An Shieh, Alpharetta, GA (US); J. Frederick Kirksey, Conyers, GA (US)

(73) Assignee: Elesys North America Inc., Suwanee, GA (US)

( * ) Notice: Subject to any disclaimer, the term of this patent is extended or adjusted under 35 U.S.C. 154(b) by 133 days.

(21) Appl. No.: 10/996,700

(22) Filed: Nov. 24, 2004

(65) Prior Publication Data

US 2006/0109091 A1     May 25, 2006

(51) Int. Cl.
    *G08B 13/26* (2006.01)
(52) U.S. Cl. .................. 340/562; 340/561; 340/667; 340/426.26; 324/207.15
(58) Field of Classification Search ........... 340/562–4, 340/567, 551–2, 426.26, 573.1, 573.4, 667, 340/686.1, 686.6, 561–564, 551–552; 324/207.11–22
See application file for complete search history.

(56) References Cited

U.S. PATENT DOCUMENTS

| | | | |
|---|---|---|---|
| 5,406,627 A | 4/1995 | Thompson et al. | |
| 5,802,479 A | 9/1998 | Kithil et al. | |
| 5,844,486 A | 12/1998 | Kithil et al. | |
| 5,948,031 A | 9/1999 | Jinno et al. | |
| 6,161,070 A | 12/2000 | Dorenus et al. | |
| 6,297,738 B1 * | 10/2001 | Newham ................ | 340/573.1 |
| 6,320,913 B1 | 11/2001 | Nakayama | |
| 6,329,913 B1 | 12/2001 | Kirskey et al. | |
| 6,329,914 B1 | 12/2001 | Kirskey et al. | |
| 6,392,542 B1 * | 5/2002 | Stanley ................... | 340/561 |
| 6,499,359 B1 | 12/2002 | Washeleski et al. | |
| 6,696,948 B2 | 2/2004 | Thompson et al. | |
| 6,816,077 B1 | 11/2004 | Shieh et al. | |
| 6,825,765 B2 * | 11/2004 | Stanley et al. ........... | 340/561 |
| 6,906,534 B2 * | 6/2005 | Hoisington et al. ..... | 324/694 |
| 2002/0000742 A1 | 1/2002 | Wato et al. | |

(Continued)

FOREIGN PATENT DOCUMENTS

DE          198 02 099         7/1998

(Continued)

OTHER PUBLICATIONS

Japanese Office Action dated Jul. 31, 2007 with English translation.

(Continued)

*Primary Examiner*—Jeffery Hofsass
*Assistant Examiner*—Hongmin Fan
(74) *Attorney, Agent, or Firm*—Brinks, Hofer, Gilson, & Lione

(57) ABSTRACT

Flexible circuit material is used for positioning one or more antennas for occupant detection within a seat. The antenna and associated signal traces to an occupant detection circuit may be more easily manufactured using a flexible material while minimizing discomfort to occupants. The flexible circuit material may be folded over a spacer in order to position occupant detection sensors or antennas at different locations or depths relative to a seating surface. An occupant detection system on a printed circuit board may be connected with the flexible circuit to provide ease of manufacture and limit costs.

35 Claims, 2 Drawing Sheets

U.S. PATENT DOCUMENTS

| | | |
|---|---|---|
| 2003/0141983 A1 | 7/2003 | Schmiz et al. |
| 2004/0163939 A1 | 8/2004 | Bieck et al. |
| 2004/0183688 A1 | 9/2004 | Orlewski |
| 2005/0149284 A1* | 7/2005 | Nathan et al. .............. 702/101 |

FOREIGN PATENT DOCUMENTS

| | | |
|---|---|---|
| EP | 1 050 057 B1 | 1/1999 |
| EP | 1 050 705 B1 | 8/1999 |
| EP | 1 151 310 B1 | 2/2000 |
| EP | 1 390 701 B1 | 5/2002 |
| FR | 2 744 547 | 8/1997 |
| JP | 11-005509 A | 12/1999 |
| JP | 2000-065658 A | 3/2000 |
| JP | 2001-180354 A | 3/2001 |
| WO | WO 99/39168 | 8/1999 |

OTHER PUBLICATIONS iEE Products PPD brochure 1995.
iEE Products CPOD brochure 2001.
iEE Products OC brochure—Nov. 1, 2004.
European Search Report and Written Opinion, Feb. 13, 2006.

* cited by examiner

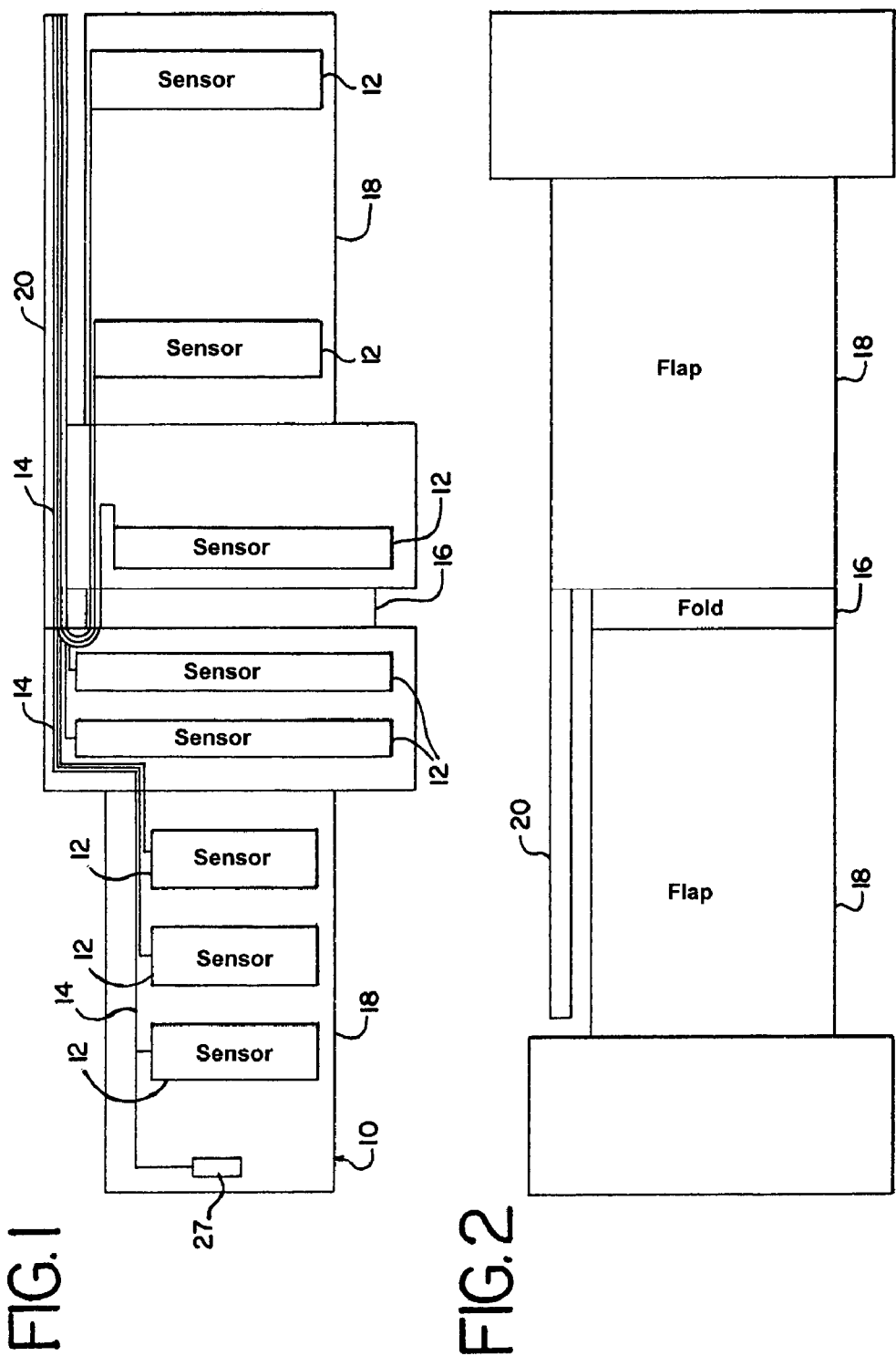

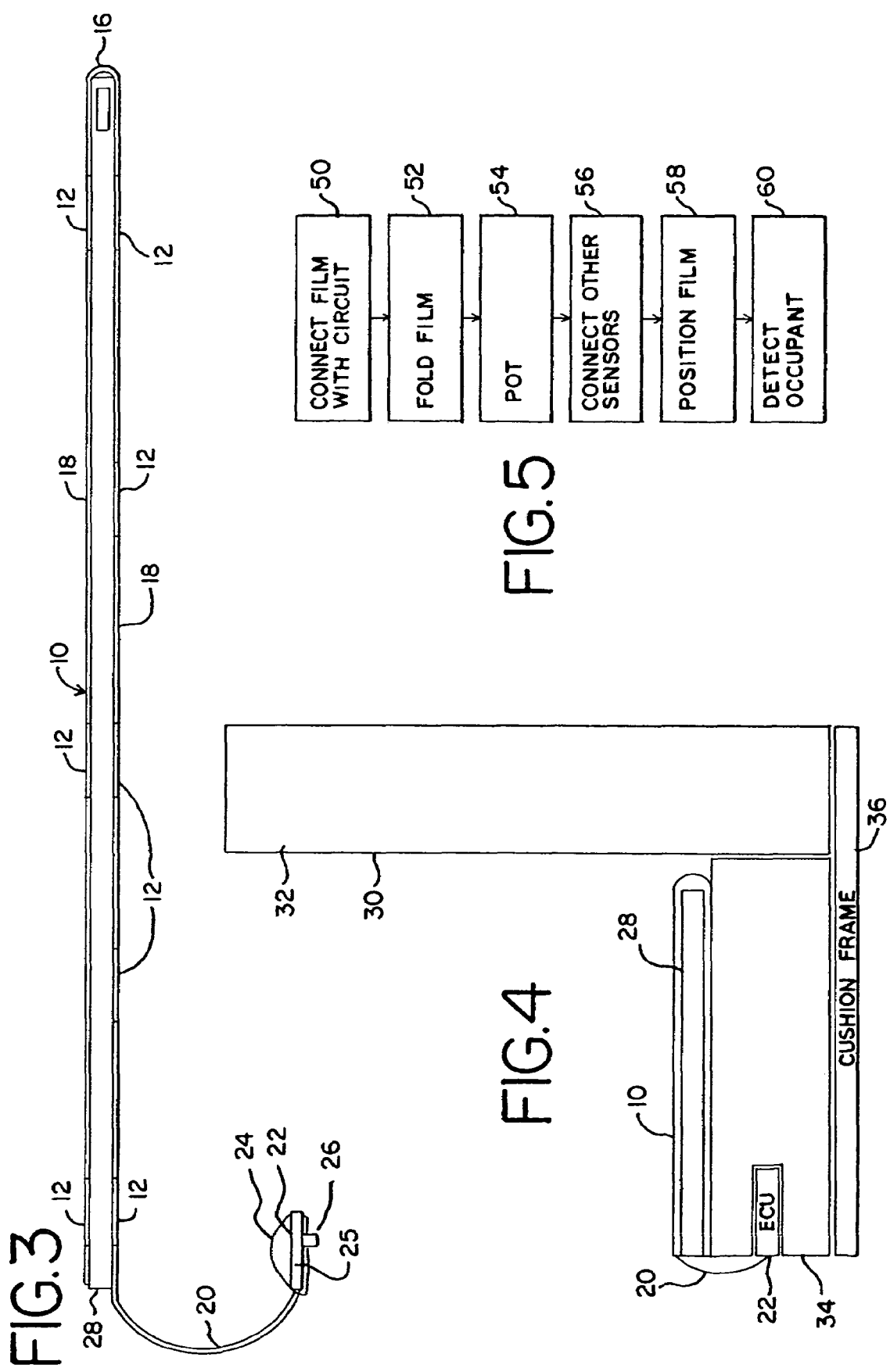

FLEXIBLE OCCUPANT SENSOR AND METHOD OF USE

BACKGROUND

The present invention relates to occupant detection. In particular, a flexible occupant sensor and associated methods for use with occupant detection are provided.

Occupant detection may be used in conjunction with sensing a crash for determining whether to activate an airbag. Various occupant detection systems have been proposed, including detection based on ultrasound, infrared, radar, electric field, capacitance, weight or combinations thereof. The occupant detection systems use antennas positioned in various locations within a vehicle, such as within a windshield, within a roof liner, on floor mats, or within a seat. The antennas are piezoelectric material, conductive materials, or other structures. For example, a conductive textile or flexible metallic electrode is positioned within a seat for capacitive or electric field based detection of an occupant. As yet another example, strain gauges or other associated pressure sensing sensors are positioned on flexible circuit material within a base portion of the seat.

BRIEF SUMMARY

By way of introduction, the preferred embodiments described below include methods and systems for occupant detection. Flexible circuit material is used for positioning one or more antennas for occupant detection within a seat. The antenna and associated signal traces to an occupant detection circuit may be more easily manufactured using a flexible material while minimizing discomfort to occupants. In some embodiments, the flexible circuit material is folded over a spacer in order to position occupant detection sensors or antennas at different locations or depths relative to a seating surface. In some embodiments, an occupant detection system on a printed circuit board is connected with the flexible circuit to provide ease of manufacture and limit costs.

In a first aspect, a sensor system is provided for occupant detection. At least one antenna and associated signal trace are on flexible circuit material. A circuit board more rigid than the flexible circuit material includes an occupant detection circuit. The occupant detection circuit is connected with the signal trace. The occupant detection circuit is operable to detect a presence or characteristic of an occupant in response to transmitted energy.

In a second aspect, a method is provided for occupant detection in a vehicle. Flexible circuit material is connected to a more rigid circuit board. At least one antenna and associated signal trace is on the flexible circuit material, and an occupant detection circuit is on the circuit board. The occupant detection circuit detects with the at least one antenna a presence or characteristic of an occupant in response to transmitted energy.

In a third aspect, a sensor system is provided for occupant detection. Flexible circuit material has first and second antennas. A separator with two sides separates the two antennas. The flexible circuit material is on both sides of the separator. An occupant detection circuit connects with the two antennas.

In a fourth aspect, a method is provided for occupant detection. A flexible film is folded over at least a portion of a spacer. The flexible film has two antennas. One antenna is adjacent to one side of the spacer and the other antenna is adjacent to an opposite side of the spacer. The two antennas are used to detect the presence or characteristic of an occupant.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIGS. 1 and 2 show different embodiments of a flexible film with sensors;

FIG. 3 is a side view of one embodiment of an occupant detection system with a spacer or separator;

FIG. 4 is a side view diagram of one embodiment of the occupant detection sensor of FIG. 3 as used in the seat of a vehicle; and FIG. 5 is a flow chart diagram of one embodiment of a method for detecting an occupant.

DETAILED DESCRIPTION OF THE DRAWINGS AND PRESENTLY PREFERRED EMBODIMENTS

FIGS. 1-4 show embodiments of a sensor system for occupant detection. The sensor system is used in various environments, such as for detecting an occupant within a seat of a vehicle. The sensor system connects with an airbag controller, but may be used for detecting an occupant for other purposes.

As shown in FIGS. 1-3, the sensor system includes a flexible film 10. The flexible film 10 is flexible circuit material, such as a Polyimide (Kapton®) film, PET Polyester (Mylar®) film, PEN Polyethylene Napthalate or other now known or later developed flexible materials for use as a flexible circuit substrate. The flexible circuit material may have active or passive electrical circuit components integrated on the material, or the flexible film 10 is free of active and/passive components.

The flexible film 10 has one or more sensors 12 and associated signal traces 14 formed on the material. The sensors 12 are copper, conductive electrodes, strain gauges, pressure sensors, radio frequency antennas, piezoelectric films, semiconductor film based diodes or light detectors, combinations thereof or other now known or later developed sensors for detecting a presence or characteristic of an occupant. As represented in FIGS. 1-3, the sensors 12 are antennas or electrodes for use with capacitance or electric field based sensing. The sensors 12 are free of active or passive circuit components, but may include such components. Eight sensors 12 are shown, but fewer or greater number of sensors of the same or different shapes may be provided. Each of the sensors 12 is separate and spaced apart from the other sensors 12. In alternative embodiments, the separate sensors are provided one within the other or overlapping as a function of different sides of the flexible film 10.

The sensors 12 are used by an occupant detection circuit 22 for transmitting and/or receiving data. The signal traces 14 are isolated from each other for the various sensors 12. The signal traces 14 are of a same or different material as the sensors 12, such as both being deposited, etched or form rolled annealed copper or other flexible metallic or conductive material.

The flexible film 10 includes a fold or middle section 16, end flaps 18 and a tail 20. The sensors 12 are distributed on each of the end flaps 18 while the fold section 16 is maintained free of sensors, but may have sensors in other embodiments. The traces 14 from the various sensors 12 are routed along the flexible material 18 to the tail section 20. The traces 14 extend along the tail section 20 for connection with the occupant detection circuit 22. Each of the end flaps 18 is formed out of two sections (e.g., a "T" shape), but may be of any shape. The wider and narrower sections reside within the main seating portion area of the seat and in another configuration can be further extended to include the side bolsters of the seat cushion. In one embodiment, the flexible film 10 is 36 inches long to be folded over to cover an 18 inch area of the seat and 15 inches wide at the widest. Other sizes may be provided. The tail section 20 is of any length, such as from a few inches to a yard. In alternative embodiments, the end flaps 18 are of different shapes than each other or are separate flexible films 10 free of the junction of the folding section 16. In yet other alternative embodiments, the flexible film 10 is used as a single layer device without a fold section 16.

The flexible film 10 is a solid material, but may include apertures in sections apart from or including the sensors 12. For example, one or more apertures are formed along a line joining two sections of different widths along each of the end flaps 18. The apertures may allow for greater flexibility, airflow, water drainage or be provided for other purposes. For example, the apertures are formed for more easily allowing the flexible film 10 to conform to the molded structure of a seat.

In one embodiment, the sensors 12 are to be distributed at different depths away from an occupant, such as disclosed by U.S. Pat. Nos. 6,320,913 and 6,329,914, the disclosures of which are incorporated herein by reference. The flexible material 10 is folded over at least a portion of a spacer 28. The spacer 28 is a separator of compressible material, such as foam. The spacer 28 is of a same or different type of foam used in the seat. Non-compressible materials may alternatively be used. In one embodiment, the spacer 28 is a non-conductive material, but conductive materials may alternatively be used, such as where the flexible film 10 isolates the sensors 12 from the spacer 28. As shown in FIG. 3, the sensors 12 are positioned against the spacer 28 with the flexible film 10 protecting the sensors 12 from external contact. The flexible film 10 is folded at the folding section 16 so that different portions or end flaps 18 are on different sides of the spacer 28. As shown, the sensors 12 are on opposite sides of the spacer 28. In alternative embodiments, the spacer 28 is shaped other than a flat plate, and the sensors are on sides at other angles to each other. As an alternative to the structure shown in FIG. 3, two different flexible films 10 without the folding section 16 on different side of the spacer 28 are provided. Two tail sections 20 connect with the occupant detection circuit 22.

The spacer 28 is sized to completely separate the two end flaps 18 from each other with alignment of the sensors 12 on each side of the spacer 28 relative to each other. Rivets, bolts, through holes, stitching, glue, adhesive, pressure, friction or other connectors or types of connections may be used to maintain the flexible material 10 in position relative to the spacer 28. The spacer 28 is shaped in the same shape as the end flaps 18, but may alternatively have a different shape. The size of the spacer 28 is similar to, but may be smaller or larger than the end flaps 18 of the flexible film 10.

The tail section 20 extends from the sandwich of the flexible film 10 and the spacer 28. The length and origin of the tail section 20 allows for placement of the occupant detection circuit 22 in various locations relative to the sensors 12 or a seat. As shown, the tail section 20 extends away from the spacer 28 without folding over the spacer. In alternative embodiments, the tail section folds over or through a portion of the spacer 28. Other origins or lengths may be used.

FIGS. 3 and 4 show the occupant detection circuit 22 connected with the signal traces 14 on the tail section 20. The occupant detection circuit 22 is on a circuit board 25. The circuit board 25 is a printed circuit board, such as an epoxy and fiber glass laminate. The circuit board 25 is more rigid than the flexible circuit material or flexible film 20. Active and passive components of the occupant detection system 22 are soldered, connected or otherwise formed on the circuit board 25.

Push through or compliant pins connect the traces 14 on the flexible material 10 with electrical traces and components on the circuit board 25. Alternatively, bonding, wire bonds or other connections are used. In alternative embodiments, a portion or the entirety of the occupant detection circuit 22 is formed as a flexible circuit on the flexible film 10.

As shown in FIG. 3, the occupant detection circuit 22 and associated circuit board 25 are potted or encased in an epoxy, resin or other non-conductive substance for protection from the environment. In one embodiment, only a portion of the circuit board 25 and associated occupant detection circuit 22 are potted, such as a portion where the flexible tail 20 connects with the circuit board 25. The remainder of the circuit board 25 and occupant detection circuit is free of potting. Additionally or alternatively, the circuit board 25 and occupant detection circuit 22 are positioned within a zinc, plastic, aluminum, combinations thereof or other material shaped as a housing. For example, a case with a snap on cover is provided, where the tail 20 extends through the cover. An additional connector 26 is provided for connecting the occupant detection sensor 22 with other components, such as a controller for controlling operation of an airbag. The housing may have O-rings or other structures for preventing water from contacting the occupant detection circuit 22 or otherwise preventing environmental access to the circuit.

The occupant detection circuit 22 is a processor, amplifier, filter, applications specific integrated circuit, field programmable gate array, digital component, analog component, combinations thereof or other now known or later developed devices for determining a presence or characteristic of an occupant. For example, the occupant detection circuit 22 determines resistance, current or voltage associated with a pressure sensor. As another example, the occupant detection circuit 22 uses pattern recognition or other processes for optical, acoustic or infrared sensing. In yet another example, one of the occupant detection circuits disclosed in U.S. Pat. Nos. 5,406,627, 5,948,031, 6,161,070, 6,329,913, 6,329, 914, 6,816,077, and 6,696,948, the disclosures of which are incorporated herein by reference, is used. The effect of an occupant on an electric field is used to determine the presence or other characteristic of an occupant, such as a human or an inanimate occupant. The loading current or other values associated with the transmission of radio frequency waves are used to determine the occupant information. Alternatively, the transmission from one sensor 12 and reception at other sensors 12 is used. Other electric field or capacitive sensing circuits may be used, such as a circuit for determining a capacitance, a frequency change, current level, voltage level or other characteristic of an occupant effect on an electric field or a capacitance value.

Additional components may be formed on or connected to the flexible material 10. For example and as shown in FIG. 1, a temperature, humidity or both temperature and humidity sensor 27 are connected with the flexible material 10. In one embodiment, one of the additional sensors disclosed in U.S. Pat. No. 6,816,077 is provided. In one embodiment, an aperture is formed in the flexible material 10 for positioning of a printed circuit board or discrete sensor components for connections with a trace or traces 14 on the flexible material 10. The connection is spaced from the tail 20 or the occupant detection circuit 22. The trace 14 extends from the sensor 27 to the occupant detection circuit 22. In alternative embodiments, the additional sensor or sensors 27 are formed on the flexible film 10, such as forming a flexible circuit.

FIG. 4 shows the positioning of the sensor system in a seat 30. For example, the seat 30 is a passenger, driver, bench, bucket or other seat of a vehicle. The flexible film 10 is positioned at least part within the vehicle seat, such as being positioned adjacent to an upper surface of a base portion 34 of the seat 30 beneath the textile or fabric covering. As shown in FIG. 4, the flexible film 10 is positioned on a top of the base portion 34, but may alternatively be positioned between multiple layers of foam or other base portion seat materials. In alternative embodiments, the flexible film 10 is positioned within or adjacent to a top portion 32, both the base portion 34 and top portion 32 or spaced from the seat 30, such as in a headliner or dashboard.

The tail section 20 allows placement of the occupant detection circuit 22 in various locations relative to the sensors 12 and associated flexible film 10. As shown in FIG. 4, the occupant detection circuit 22 is positioned within a void or other structure formed within the base portion 34. In alternative embodiments, the occupant detection circuit 22 is positioned elsewhere within the vehicle. For an example with fold flat seats, the occupant detection circuit 22 is mounted under the front cushion frame 36 or along a side of the base portion 34 or the cushion frame 36. Standard seats may allow a mount to the cushion, cushion frame 36 or within the back section 32, such as between a back frame and back covering. The tail section 20 may extend from the flexible circuit 10 in the desired mounting direction. In one embodiment, the tail section 20 extends through a gap in the stitching connecting the covering fabric to a J-strip or other trim connector for connecting with the occupant detection circuit 22 on the cushion frame 36 beneath the seat 30. The orientation of the occupant detection circuit 22 may avoid folds in the tail section 20. Alternatively, the circuit 22 may be positioned at any of various angles accommodated by the flexibility and folding of the tail section 20. The circuit board 25 or the associated housing is connected with the cushion frame using screws, plastic fasteners, bolts, adhesive, latches, clips, or other now known or later developed structure. The housing or printed circuit board 25 may be bonded, stitched or otherwise attached to textile covering or foam of the seat 30.

Further cabling, wireless connection or other communications paths are provided for transmitting or receiving information from or to the occupant detection circuit 22 to another processor, device or system. For example, the occupant detection circuit 22 is operable to transmit information along a cable to an air bag system spaced away from the seat 30. Alternatively, the occupant detection circuit 22 includes the air bag system controller. For example, the occupant detection system 22 detects movement of the occupant to sense a crash or includes a separate crash sensor within the seat 30, or spaced from the seat 30. The occupant detection circuit 22 determines whether or not to activate air bag deployment.

FIG. 5 shows one embodiment of a method for occupant detection in a vehicle or at other locations. The method is implemented using the sensor system, flexible film 10 and arrangement shown in FIG. 3 in one embodiment. In other embodiments, a different flexible materials, configurations or arrangements of components are used. Different, additional or fewer acts may be provided, such as implementing the method without act 52, without act 54, without act 56, or without combinations thereof.

In act 50, flexible film is connected with an occupant detection circuit. For example, flexible circuit material is connected with a more rigid circuit board. The flexible circuit material is connected to the circuit board using bonding, clips, pins, soldering, pressure, connectors, combinations thereof or other now known or later developed connection technique. One or more antennas and associated signal traces are provided on the flexible circuit material. The flexible circuit material is otherwise free of active and/or passive circuit components. Where multiple antennas or other sensors are provided on the flexible circuit material, the plurality of antennas is connected with separate traces to the occupant detection circuit. Alternatively, one or more of the traces are connected together to provide a larger or combined sensor. The occupant detection circuit is formed on the circuit board. Alternatively, the occupant detection circuit is formed on the flexible circuit material. The flexible circuit material is connected with the occupant detection circuit by patterning, etching or formation of the traces and associated circuitry.

In act 52, sensors are arranged relative to each other. For example, the flexible film is folded around at least a portion of a spacer or other structure. The spacer is part of an already existing structure, such as part of a seat. Alternatively, the spacer is adapted for use with the sensor and is added to the seat or other structure. In one embodiment, one or more sensors or antennas are provided on a top or one side of the spacer, and one or more other sensors are provided on a bottom, opposite or other side of the spacer. While a two layer antenna structure results, three layers or antennas positioned at different angles relative to each other may be provided by folding over a spacer. In alternative embodiments, different flexible films are provided for the top and bottom surfaces without folding. In yet other alternative embodiments, only a single layer sensor structure is provided, or multiple layers are provided on different sides of the same flexible film without the spacer.

In act 54, exposed circuitry is protected. For example, a circuit board or other occupant detection circuit components are potted. The entire occupant detection circuit is potted. Alternatively, only a portion, such as associated with the connection of the flexible film to the circuit board, is potted. Alternatively or additionally, a housing is provided. The housing may encompass part or the entire occupant detection circuit. Separate covers, such as a layer of additional flexible film of the same or different material may be used for protecting the sensors and associated traces. Alternatively, no further protection other than the base flexible film is provided.

In act 56, other circuits or components are connected with the flexible film. For example, a temperature, a humidity or both a temperature and humidity sensor are connected with the flexible film. Signal traces are provided on the flexible film for routing signals to or from the additional components to the occupant detection circuit, sensors or other components. The same or different types of connections and connection techniques may be used for connecting the additional components with the flexible film.

Any of acts 50, 52, 54 and 56 may be performed in any order. The order may be based on manufacturing convenience, cost or to satisfy other purposes. The assembled sensor system is then installed in the desired location, such as the seat of the vehicle. Alternatively, portions of the sensor system are installed within the vehicle and assembled in place or assembled both separately and in place.

In act 58, the flexible film is positioned for occupancy sensing. For example, flexible circuit material is positioned at least in part within a vehicle seat. Within the vehicle seat includes positioned on an outer surface, positioned underneath a textile but over foam, positioned within the foam, positioned below the foam and above a frame, or positioned below the frame of a seat. The sensors are positioned in the base portion, the back portion or both to base and back portions of the seat. Other positions may be used for detecting a seating, standing or other position of occupants of a vehicle, a room or other location. A same flexible film may be used with separate sensors for multiple seats or different films used for different seats or portions of a same seat.

In act 60, the sensor and occupant detection circuit of the sensor system are used to detect a presence or characteristic of the occupant. For example, an antenna is used to detect the presence or characteristic of an occupant as a function of a capacitance or electric field. An alternating current is applied to a sensor. Current, voltage, capacitance or other characteristic of the transmitting sensor is measured for detecting an occupant. Alternatively or additionally, a current, voltage, capacitance or other characteristic of a different sensor receiving signals responsive to the transmissions are used to detect. The size, weight, position, motion, presence, conductivity, load, pattern or other characteristic may be determined.

In one embodiment, the presence or other characteristic of an occupant associated with a seat in a vehicle is detected. Folded flexible film or other sensor structure first positioned in a seat of a vehicle is used to later detect occupancy. Where the sensors are folded over a compressible material, such as foam or other spacer, the detection may be performed in response to an amount of compression of the compressible material. For example, the capacitance or electric field associated with sensors on opposite sides of the compressible material varies as a function of an amount of compression and the connections of the sensors. Measurements performed with the other sensors may vary as a function of amount of compression.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A sensor system for occupant detection, the sensor system comprising:
   flexible circuit material;
   at least one antenna and an associated signal trace on the flexible circuit material;
   a circuit board more rigid than the flexible circuit material; and
   an occupant detection circuit connected with the signal trace and on the circuit board, the occupant detection circuit operable to detect a presence or characteristic of an occupant in response to transmitted energy;
   wherein the circuit board directly connects with the flexible circuit material;
   wherein only a portion of the circuit board is potted, the flexible circuit material connecting with the potted portion of the circuit board.

2. The sensor system of claim 1 wherein the occupant detection circuit comprises a capacitive or electric field sensing circuit.

3. The sensor system of claim 1 wherein the flexible circuit material comprises a polyester film.

4. The sensor system of claim 1 wherein the flexible circuit material is free of active circuit components.

5. The sensor system of claim 1 wherein the flexible circuit material is folded over at least a portion of a spacer, the at least one antenna comprising at least first and second antennas, the first antenna on a first side of the spacer and the second antenna on a second, opposite side of the spacer.

6. The sensor system of claim 1 wherein the circuit board comprises a printed circuit board.

7. The sensor system of claim 1 wherein the at least one antenna and an associated trace comprises at least two antennas with separate traces connected with the occupant detection circuit.

8. The sensor system of claim 1 further comprising a vehicle seat, the flexible circuit material positioned, at least in part, within the vehicle seat.

9. The sensor system of claim 1 further comprising a temperature sensor, a humidity sensor or both on another circuit board connected with the flexible circuit material.

10. A method for occupant detection in a vehicle, the method comprising:
    (a) connecting flexible circuit material to a more rigid circuit board, at least one antenna and an associated signal trace on flexible circuit material, and an occupant detection circuit on the circuit board;
    (b) detecting with the at least one antenna and the occupant detection circuit a presence or characteristic of an occupant in response to transmitted energy; and
    (c) potting only a portion of the circuit board, the portion being at the connection of the flexible circuit material with the circuit board.

11. The method of claim 10 wherein (b) comprises detecting as a function of a capacitance or an electric field.

12. The method of claim 10 wherein the flexible circuit material is free of active circuit components.

13. The method of claim 10 further comprising:
    (d) folding the flexible circuit material is folded around at least a portion of a spacer, the at least one antenna comprising at least first and second antennas, the first antenna on a first side of the spacer and the second antenna on a second, opposite side of the spacer.

14. The method of claim 10 wherein the at least one antenna comprises a plurality of antennas, and wherein (a) comprises connecting the plurality of antennas with separate traces to the occupant detection circuit.

15. The method of claim 10 further comprising:
    (d) positioning the flexible circuit material, at least in part, within the vehicle seat;
    wherein (b) is performed after (d).

16. The sensor system of claim 10 further comprising:
(d) connecting with the flexible circuit material a temperature sensor, a humidity sensor or both on another circuit board.

17. A sensor system for occupant detection, the sensor system comprising:
flexible circuit material having first and second sensors;
a separator having first and second sides, the flexible circuit material being on the first and second sides of the separator, the first sensor adjacent the first side and the second sensor adjacent the second side; and
an occupant detection circuit connected with the first and second sensors.

18. The sensor system of claim 17 wherein the first and second sensors comprise antennas and wherein the occupant detection circuit is operable to detect a presence or characteristic of an occupant in response to transmitted energy.

19. The sensor system of claim 17 wherein the flexible circuit material is positioned within a seat of a vehicle.

20. The sensor system of claim 19 wherein the occupant detection circuit is adjacent to or within the seat and operable to transmit information to an air bag system spaced away from the seat.

21. The sensor system of claim 19 wherein the flexible circuit material is positioned adjacent an upper surface of a base portion of the seat.

22. The sensor system of claim 17 wherein the separator comprises compressible material.

23. The sensor system of claim 22 wherein the separator comprises foam.

24. The sensor system of claim 17 wherein the flexible circuit material is folded over at least a portion of the separator, the first sensor on a first side of the spacer and the second sensor on a second, opposite side of the spacer.

25. The sensor system of claim 17 wherein the flexible circuit material comprises a polyester film.

26. The sensor system of claim 17 wherein the occupant detection circuit is a flexible circuit on the flexible circuit material.

27. The sensor system of claim 17 wherein the occupant detection circuit is on a printed circuit board connected with the flexible circuit material.

28. The sensor system of claim 17 wherein the flexible circuit material comprises a tail section, first and second traces from the first and second sensors extending along the tail section and connecting with the occupant detection circuit.

29. The sensor system of claim 28 wherein the connection of the flexible circuit material with the occupant detection circuit is potted and a portion of the occupant detection circuit free of potting.

30. The sensor system of claim 17 further comprising a temperature sensor, a humidity sensor or both connected with the flexible circuit material separate from the connection with the occupant detection circuit.

31. A method for occupant detection, the method comprising:
(a) folding a flexible film over at least a portion of a spacer, the flexible film having first and second sensors formed thereon, the first sensor adjacent a first side of the spacer and the second sensor adjacent a second, opposite side of the spacer; and
(b) detecting with the first and second sensors a presence or characteristic of an occupant.

32. The method of claim 31 wherein (b) comprises detecting with the folded flexible film in a seat of a vehicle.

33. The method of claim 31 wherein the spacer comprises compressible material and wherein (b) comprises detecting as a function of an amount of compression of the compressible material.

34. The method of claim 31 further comprising:
(c) connecting an occupant detection circuit on a printed circuit board with the flexible film.

35. The method of claim 34 further comprising:
(d) potting only a portion of the printed circuit board, the portion being at the connection of the flexible film with the printed circuit board.

* * * * *